United States Patent [19]
Jones et al.

[11] Patent Number: 5,749,326
[45] Date of Patent: May 12, 1998

[54] EXTENDIBLE RESTRAINING DEVICE

[75] Inventors: Robert A. Jones; Jill S. Jones, both of 6763 Devonshire, Canton, Mich. 48187

[73] Assignees: Robert A. Jones; Jill S. Jones

[21] Appl. No.: 745,464

[22] Filed: Nov. 12, 1996

[51] Int. Cl.$^6$ .................................................. A01K 27/00
[52] U.S. Cl. .................................................. 119/798
[58] Field of Search ........................ 119/798, 795, 119/796, 797, 792, 793, 794, 863, 864; 54/34

[56] References Cited

U.S. PATENT DOCUMENTS

| | | |
|---|---|---|
| 478,076 | 7/1892 | Asten . |
| 1,296,051 | 3/1919 | Curtis . |
| 2,650,590 | 3/1953 | Moore et al. . |
| 2,737,154 | 3/1956 | Michonski ............... 119/798 |
| 2,994,300 | 7/1961 | Grahling . |
| 3,332,398 | 7/1967 | Mintz ............... 119/797 |
| 3,441,005 | 4/1969 | Fink ............... 119/798 |
| 4,499,741 | 2/1985 | Harris ............... 66/171 |
| 4,638,764 | 1/1987 | Anderson ............... 119/770 |
| 4,745,883 | 5/1988 | Baggetta ............... 119/770 |
| 4,763,609 | 8/1988 | Kulik ............... 119/797 |
| 4,777,784 | 10/1988 | Ferguson ............... 119/798 X |
| 4,879,972 | 11/1989 | Crowe et al. ............... 119/792 |
| 4,993,366 | 2/1991 | Sager ............... 119/798 |
| 5,038,719 | 8/1991 | McDonough ............... 119/772 |
| 5,357,904 | 10/1994 | Takahashi et al. ............... 119/708 |
| 5,363,810 | 11/1994 | Kraus ............... 119/795 |

FOREIGN PATENT DOCUMENTS

| | | | |
|---|---|---|---|
| 267513 | 10/1992 | France ............... | 119/798 |
| 2402614 | 7/1975 | Germany ............... | 119/798 |
| 117116 | 7/1918 | United Kingdom ............... | 119/798 |
| 426081 | 3/1935 | United Kingdom ............... | 119/798 |

OTHER PUBLICATIONS

Pet Warehouse Catalog p. #15, Aspen Pet Products, Bunchie Leash.
Pet Warehouse Catalog p. #14, Nylorite, Braided Bunch Leash.
Wichard Catalog p. #25, Wichard, Elastic Harness.

*Primary Examiner*—Michael J. Carone
*Assistant Examiner*—Yvonne R. Abbott

[57] ABSTRACT

The animal control lead comprises a length of hollow compliant material (10) and an elastic member (20) retracting the length of hollow compliant material. The length has a first and second, opposite end section. A first handle (30) is located at the first end section and a clasping device (32) at the second end section. The second end section has an optional second handle (30). The lead extends and contracts with application and removal of a tensile force between the end sections. The second handle provides increased control of the animal if needed.

14 Claims, 5 Drawing Sheets

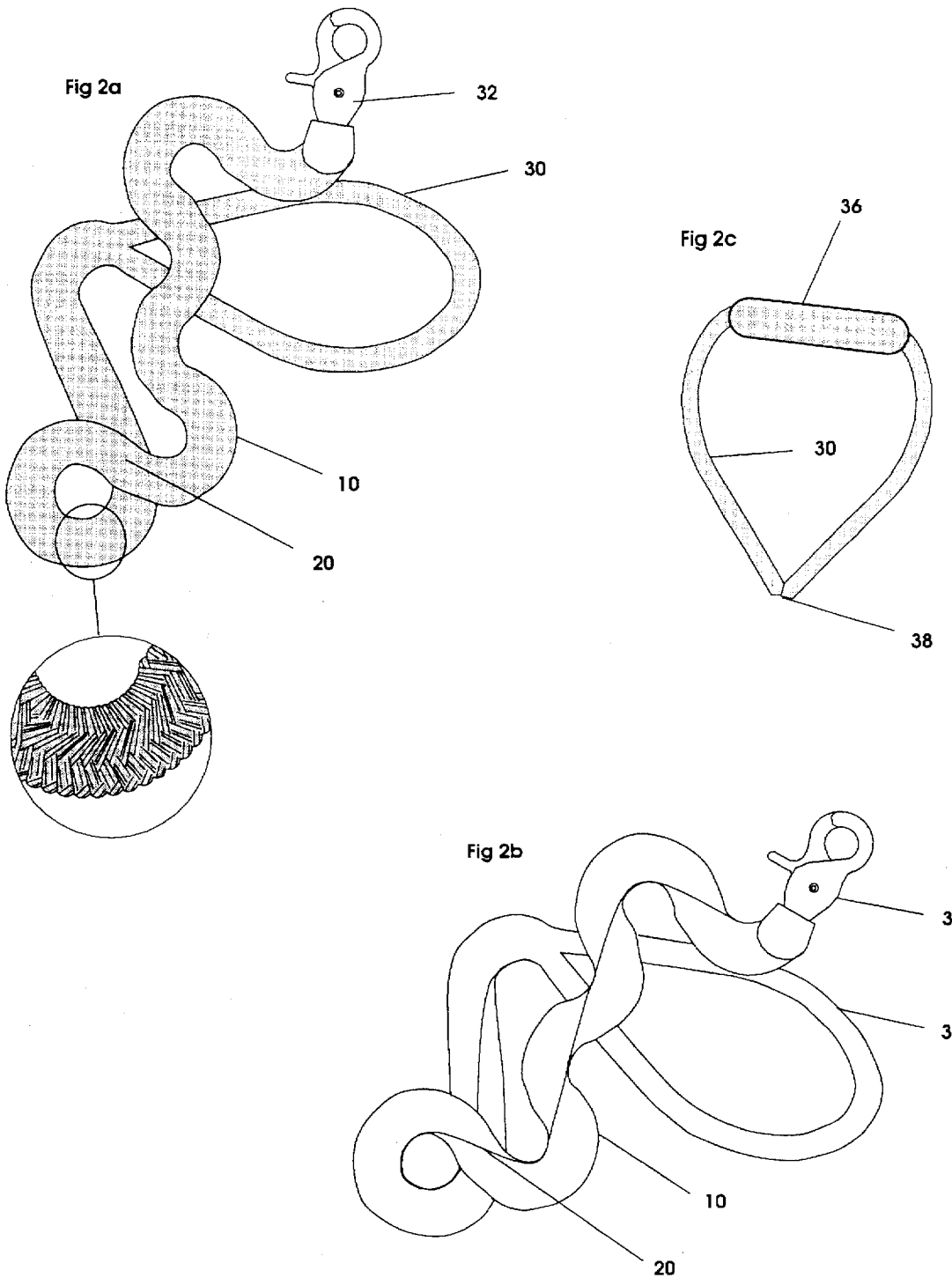

Fig 3a
Fig 3b
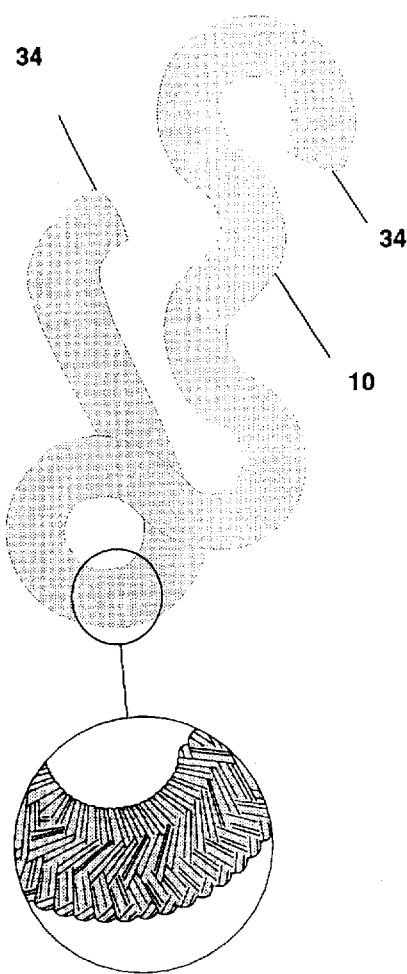
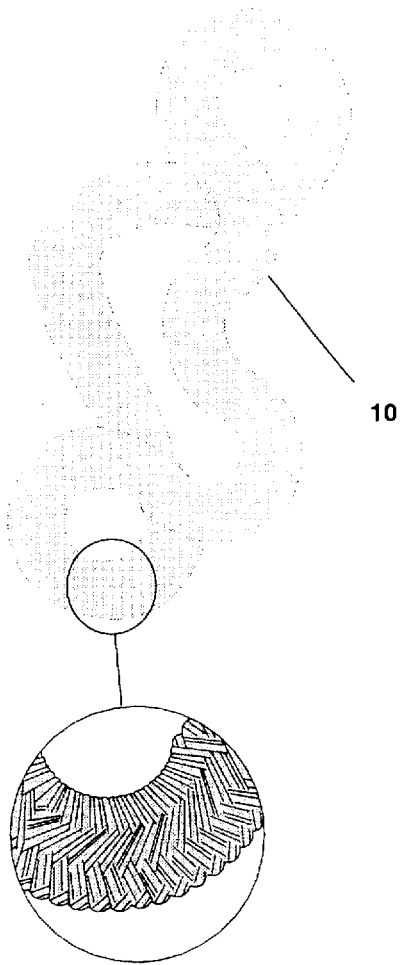
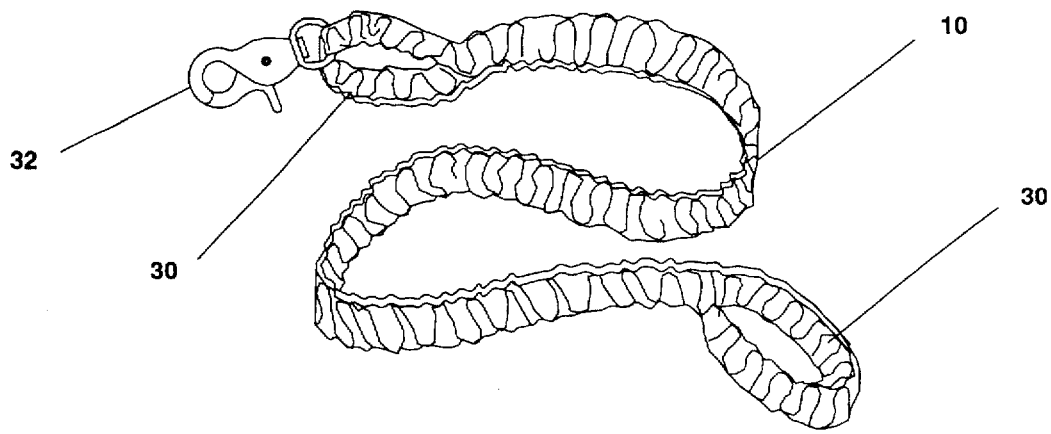
Fig 3c

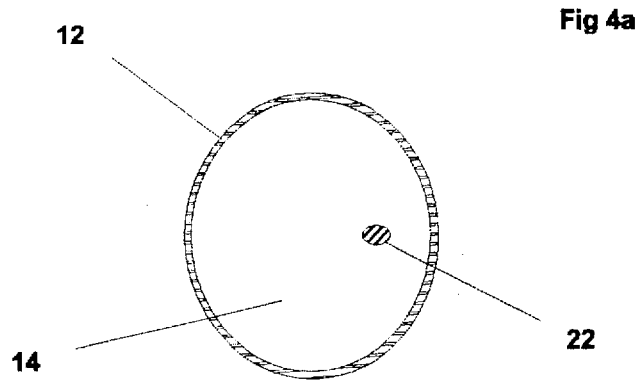
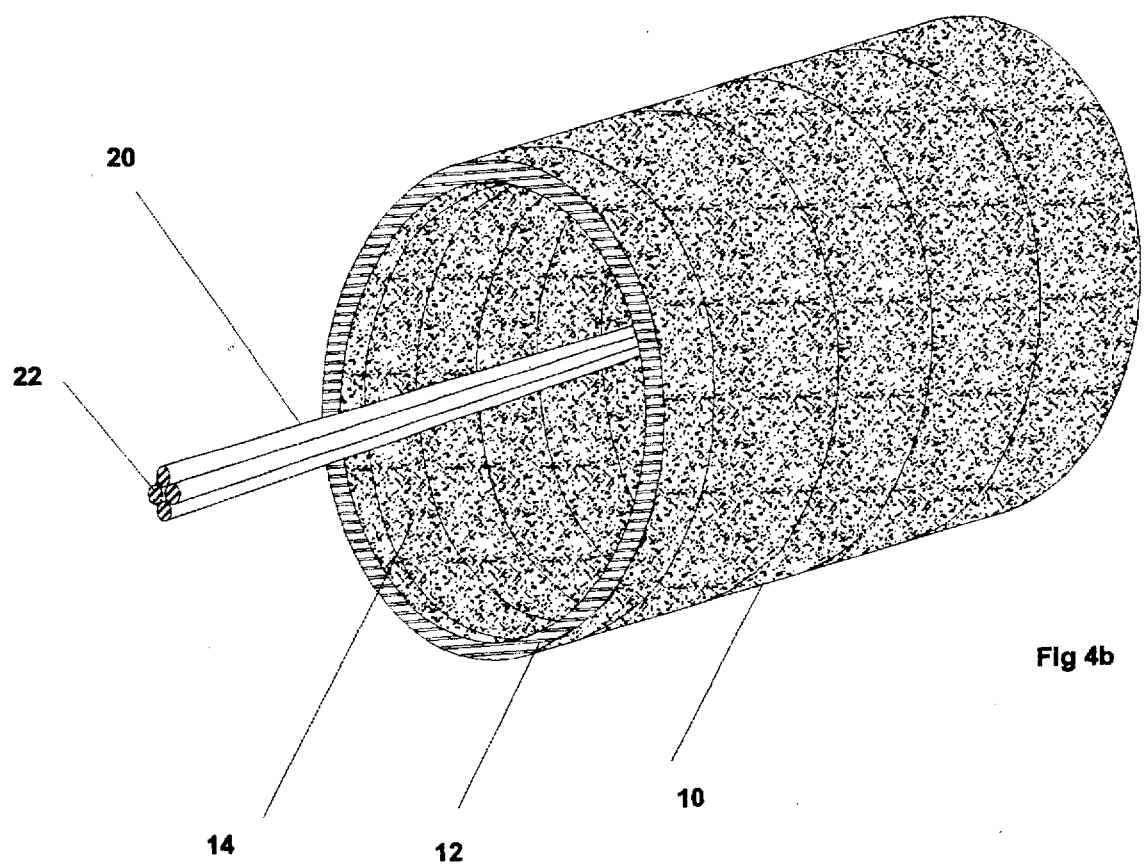

EXTENDIBLE RESTRAINING DEVICE

BACKGROUND OF THE INVENTION

This invention restricts the relative movement between two separate entities, the most common application being a leash for connecting a pet dog to its person.

DESCRIPTION OF THE PRIOR ART

People enjoy walking outdoors with their pets. People commonly use a leash or tether to keep their pet from wandering off aimlessly. Several companies offer products (leashes) that provide a connection between the person and pet. Some leashes are long, providing the animal a distance to explore while the person is walking with their pet. These long leashes often tangle up around the animal's legs when the animal gets close to the person. The person then has to untangle the animal from the long leash before continuing the walk. Short leashes are also used for walking animals. Short leashes have the disadvantage of not allowing the animal an ample distance to explore. Short leashes generally do not have the problem of tangling up the animal.

Several inventors have created devices which attempt to allow a person to have advantages of a long leash and a short leash, one of which allows the person to reel out the leash. This gives the pet leeway to explore. The device can then retract similar to a carpenter's tape measure when the animal gets close to the person, U.S. Pat. No. 4,562,792. This invention requires several specialty parts which increase the cost of the final product. This leash is two to three times the cost of a traditional leash. The leash also adds complexity to the person's casual walk with their pet. Other mechanisms have been invented in an attempt to provide the advantages of a short and long leash. These other mechanisms have been documented by U.S. Pat. Nos.: 4,828,210, 4,391,226 and 3,752,127. All of these inventions are mechanisms which may require additional input from the user to adjust the distance between the pet and person. Additionally a leash was invented that stretches out and retracts similarly to a bungie cord, named the Bunchie Leash. This leash has a related patent, U.S. Pat. No. 4,745,883. It has reduced control of the dog.

All leashes to date suffer from different disadvantages:

a) too long, allowing pet's legs to tangle with the leash.

b) too short, not allowing the pet to explore.

c) too complex, using gadgets to control pet distance.

d) too expensive, limiting consumer sales.

e) not providing adequate control.

OBJECTS AND ADVANTAGES

Besides the objects and advantages described in my above patent, advantages of the above patent are:

f) To provide the person a connection to their pet which allows the pet sufficient distance to explore.

g) To provide a connection between the person and pet that minimizes the potential of tangles around the pet and its appendages.

h) To provide the person a connection to their pet which automatically extends and retracts without gadgets and/or buttons.

i) To provide a connection between the person and pet with a novel appearance.

j) To maintain control of the pet.

Further objects and advantages are to provide a low material cost for manufacture, in turn maintaining a competitive price for the market place. An additional benefit is the hand labor of assembly, providing employment for people. Still further objects and advantages will become apparent from a consideration of the ensuing description and drawings.

DRAWING FIGURES

In the drawings, closely related figures have the same number but different alphabetical suffixes.

FIG. 1a shows a leash body in an extended state and end conditions connecting a dog and person to the leash.

FIGS. 1b, 1c, 2a, 2b, 3a, 3b, and 3c show the leash body in a retracted state.

FIG. 2c shows the handle with a sleeve protector.

FIGS. 4a and 4b are a cross section and an isometric section respectively, showing an example of how an elastic member can fit inside a hollow leash body.

REFERENCE NUMERALS IN DRAWINGS

10—hollow body.
12—cross section of body.
14—cross section of hollow.
20—elastic member(s).
22—cross section of (20) elastic member(s).
30—handle.
32—de-mountable connector.
34—stub.
36—sleeve cover for handle.
38—location for a hollow body (10) to attach to a handle (used on a concatenated figure).
40—example of present invention leash-design: force vs. strain.
42—bungie cord: force vs. strain.
44—Bunchie Leash: force vs. strain.
46—seamstress' sewing elastic: force vs. strain.

DESCRIPTION—FIGS. 1 TO 4

FIG. 2a shows an example leash in a curled-up (retracted) condition, including a body (10), with a handle (30) and a de-mountable connector (32) as end conditions. A variety of marketable products, including: leashes for animals, leashes for snowboarding and novelty clothing items such as belts or bracelets can be made. Further end products include items such as tow ropes. Still further end products will become apparent from a consideration of the ensuing descriptions and drawings. FIG. 2b illustrates one example of a probable view inside a curled-up (retracted) leash, showing the elastic member(s) (20), inside a retracted body (10).

Figure 1A:
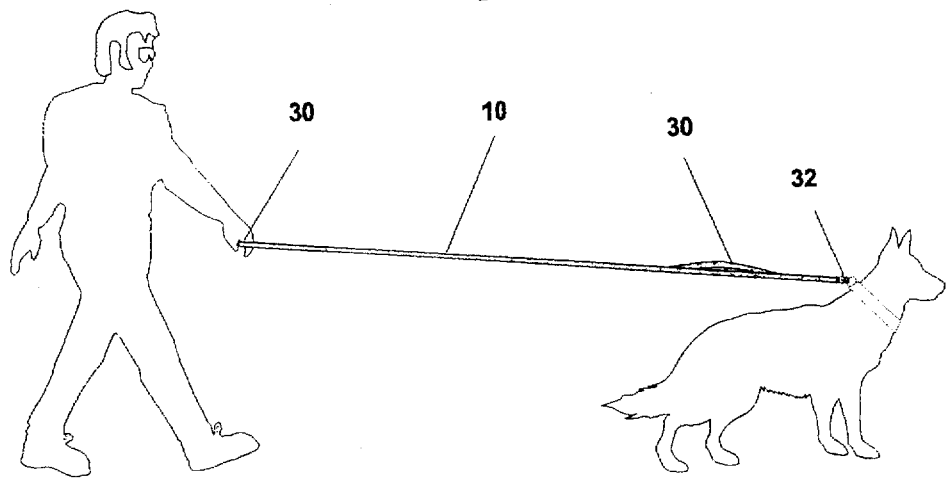
FIG. 1c shows the leash body in a retracted state and a person holding two handles (end conditions) and a demountable connector attached to a dog.
Figure 1B:
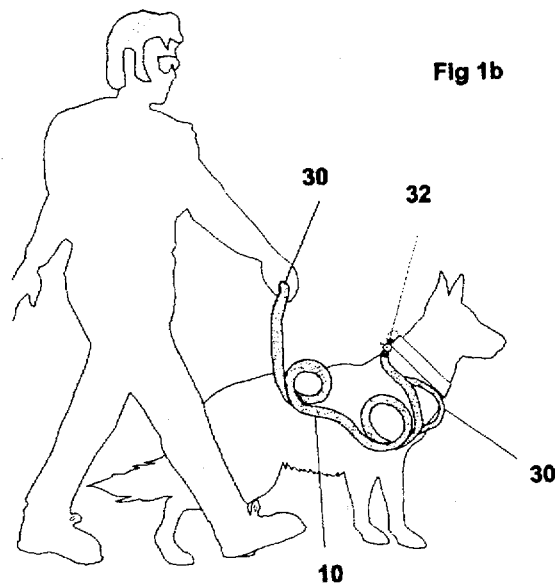

External forces applied to the leash, pulling extreme end conditions apart (tensile) will stretch the body (10) and elastic member(s) (20). At a specific nominal force, the body will reach an extended length. At forces above this specific nominal, the body supports nearly all of any additional force applied pulling end conditions apart. The body length remains relatively constant at various tensile force conditions that are above the specific nominal force. FIG. 1a illustrates the leash in an extended state. A force pulling end conditions apart is required for this extended state to exist.

Figure 5:
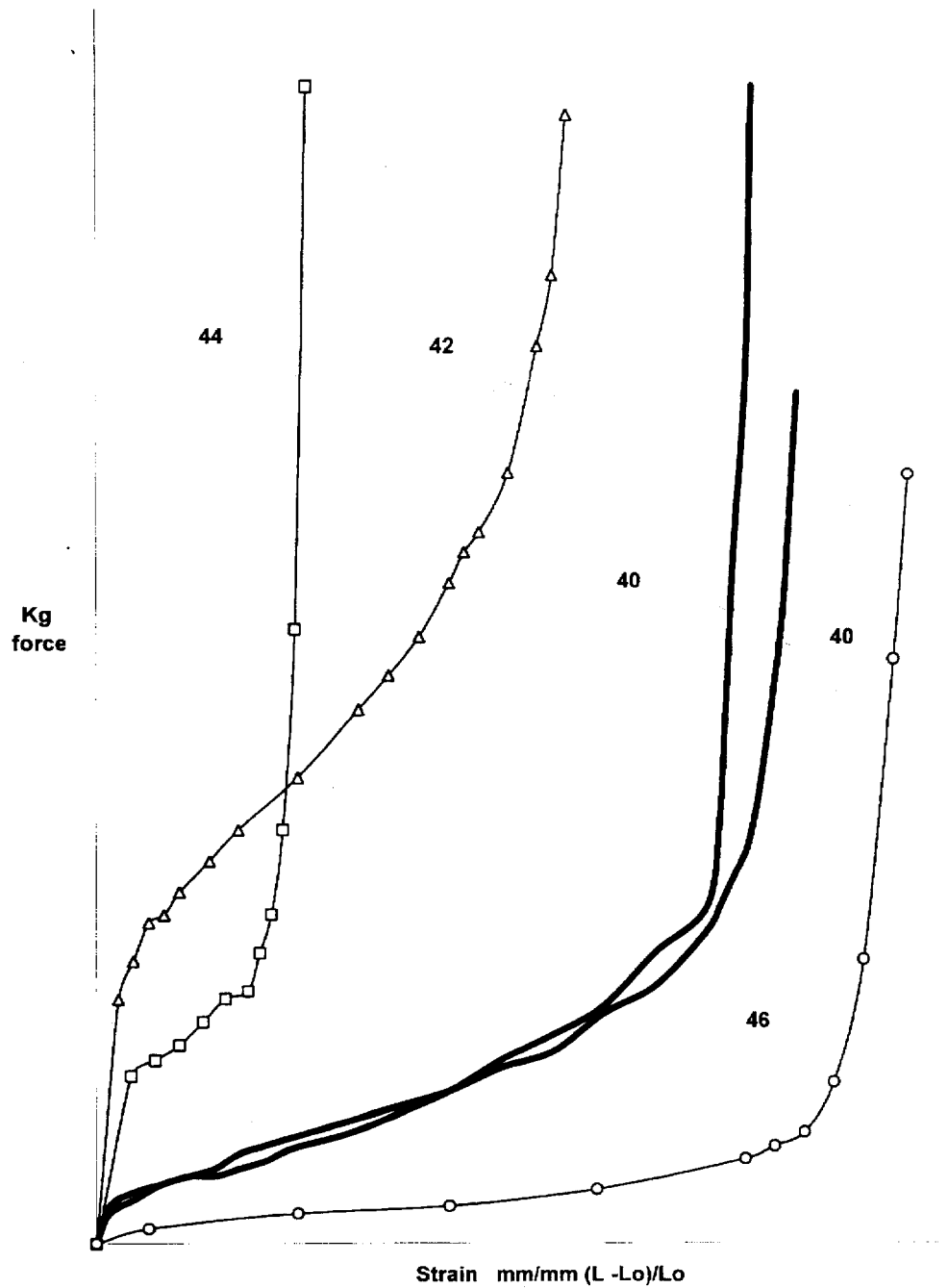
FIG. 5 is a graph comparing the properties of a particular example of the present invention to the properties of similar products.

A force versus strain plot (FIG. 5) is useful in the description of this invention. The force versus strain plot depicts the variable stiffness typical of an example leash design at hand when measured at 78° F. A tensile-force pulling the ends apart is plotted on the abscissa axis. Strain (L - Lo)/Lo is plotted on the ordinate axis. With Lo being defined as the length, excluding extreme end conditions, after 1 hour of hanging freely from one end condition. A force is applied to the leash for five seconds and released. A corresponding length (L) is measured within this five seconds. Several increments of force and length are recorded and plotted to produce FIG. 5. FIG. 5 shows that there is a large difference between this present invention and other seemingly similar products. The Bunchie Leash force versus strain plot (44) does not provide adequate extendibility (strain) and also requires significantly more force for a given strain. This product does not provide adequate area for a pet to explore. A standard bungie cord (42) provides some extendibility, but requires an extremely high force to achieve it. A bungie cord would fatigue the owner's arm if it were used as an extending leash. The seamstress' sewing elastic (46) has extendibility similar to the present invention, but this sewing elastic does not have the required strength to restrain a dog. This sewing elastic broke from one application of an eight pound force applied as a vigorous jerk. Clearly this sewing elastic could not restrain even an eight pound dog.

The leash body (10) can be constructed from a number of different raw materials, including hollow braid. Several hollow braid compositions can be used. Most common are polymeric materials such as: polypropylene, polyethylene, polyester, aramid and/or nylon. Further materials such as cotton, paper, glass, metal and/or carbon fiber are also possibilities. Hybrids of these different materials braided together have definite advantages. Hollow tubes of fabric can also be used. Hollow tubes of fabric have similar possibilities for material compositions.

Hollow braid can have as few as three braided cords up to hundreds of braided cords. In general, more than two long cords are braided together. Each cord usually is comprised of multiple independent fibers gathered into a bundle. Alternatively, cords could be unitary. Hollow braid is very similar to a "Chinese finger trap." Chinese finger trap action is a common trait of hollow braid. Braided cords move with respect to each other to allow Chinese finger trap action: radial expansion and angular displacement of hollow braid due to a longitudinal compressive force, akin to a radial contraction an angular displacement of hollow braid member due to a longitudinal tensile force. Finger trap action is frequently used to constrain hooks on to water skiing ropes by feeding the rope end back into the rope body. Not all finger trap action is able to support loads such as the water-skiing example. An example of the present invention will form curls in a retracted condition if hollow braid is used as the hollow compliant member. Unlike a typical bungie cord, the present invention constructed with hollow braid does not fill the entire hollow with elastic members, as shown in FIGS. 4a and 4b. This allows the hollow member freedom to form curls. The present invention constructed with other types of hollow members, such as hollow tubes of fabric may not form curls, FIG. 3c.

The elastic member (20) can be a single member or several members together. Singular elastic members can have advantages, including easy assembly of the leash. Using several elastic members also has advantages, including enhanced durability. Several materials can be used as elastic members including rubber, steel, urethane and other polymers.

End conditions increase the versatility of the present invention. De-mountable connectors (32) and handles (30) are self evident. A small, handle-type end condition (30) can also be used to locate an effective device such as a boat anchor. Combinations of multiple handles and de-mountable connectors are very useful, as shown in FIGS. 1a, 1b, 1c, 3c. Additionally, sleeves (36) may be incorporated to increase personal hand comfort, shown in FIG. 2c. A stub end condition (34) would allow the user to define how she or he uses the product. An example of a stub end condition is shown in FIG. 3a. Connected end conditions (loops, FIG. 3b) appear to be, but are not without end conditions. Loops can be made by connecting stub end conditions, or individually connecting the internal elastic member ends together, and body ends together, thus a loop of elastic member internal to a loop of body.

OPERATION—FIGS. 1, 6

Figure 1C:
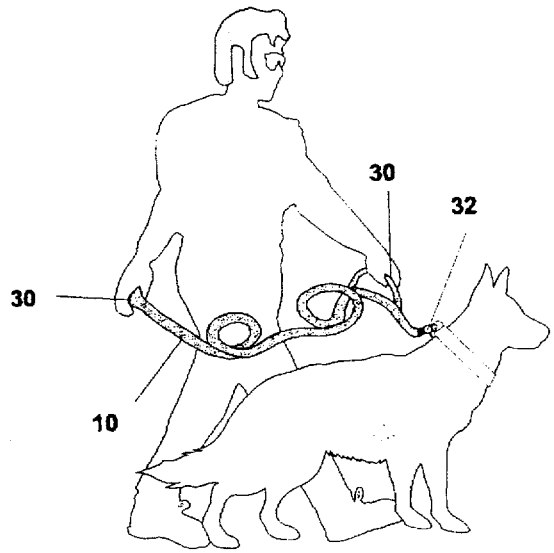

The manner of using the extendible leash is identical to that for leashes in present use. Specifically, a person connects an animal to the extendible leash at one end, usually a de-mountable connection device (32). The person then holds on to the handle (30), and proceeds on a casual walk with their pet. An advantage of the extendible leash is that it allows the animal and person to walk at different paces without slack in the leash. The animal and person start out side by side, the leash in a retracted state. When the animal walks away from the person, the leash extends, allowing the animal a distance to explore. The leash will reach a final extended length when the animal and person are a few meters apart, FIG. 1a, thus restraining the pet. The person and animal can walk with the leash at any position: retracted, extended or any position in between without dragging the leash on the ground or tangling up the animal. If the person encounters other people, animals or hazards he or she can hold both ends of the device, an example of this is shown in FIG. 1c. This example uses a first and second handle (30), thus aiding the restraint of the animal further, keeping the animal at close guard.

SUMMARY

Accordingly, the reader will see that the extendible restraining device of this invention can be used to restrain a dog or two separate entities of any type. Clearly, this extendible restraining device offers freedom between the two entities, with a final limiting length. With the addition of more handles the user can choose to further limit the extendibility between the separate entities. This restraining device extends incomparably for a minimal exerted force, thus providing comfort for the user; in the same note, the restraining device is very strong. The restraining device with a handle at one end and a second handle and clasping device at the other is useful for restraining a dog. The scope of this invention is not limited to this single application. As noted before, this invention combined with different end conditions can make a variety of products, including the previously mentioned applications and more. This invention can even be used as a tie down strap.

As previously described, the hollow body (10) can be made up from virtually any material or combination thereof: polymer, metal, glass, natural fibers, even rubber. These materials can be formed into a hollow member by braiding, weaving, knitting, sewing, and even pressing. The elastic member (20) again can be almost any material composition or combination of materials. The body and elastic member together provide the desired combination of extendibility, retracting force, strength, and durability of the restraining device. Using the body to constrain the elastic member is key to providing this combination of properties. The hollow body does not even have to fully encircle the elastic member, for example the elastic member could even be woven or braided into the body. End conditions enhance the usability of the invention for several different products including leashes, tow ropes, tie-down straps, boat anchor ropes, loops and more. Furthermore, end conditions of several extendible restraining devices can be combined to provide a restraining device between two, three or even more separate entities.

We claim:

1. A restraining devise comprising of:
   a. a unitary stretch member having a length of hollow braid and an elastic member affixed therein, substantially between a first and second end section so as to retract said unitary stretch member from a fully extended state;
   b. said hollow braid able to radially expand and angularly displace, aiding retraction of said unitary stretch member;
   c. said unitary stretch member having a length that is variable, including a first length in a retracted state and a second length in a fully extended state;
   d. said elastic member having a cross section which is proportioned considerably smaller than cross section of said hollow braid allowing relative radial displacement between hollow braid and elastic member inturn creating forces that curls said unitary stretch member to benefit retraction.

2. The retraining device of claim 1 with said first end section affixed within close proximity to said second end section inturn forming a stretch member loop.

3. The restraining device of claim 1 further including a first handle means located substantially about said first end section and a clasping device located substantially about second end section.

4. The restraining device of claim 3 further including a second handle means located within close proximity to second end section.

5. The restraining device of claim 4 having:
   a. a third length at least 40% longer than said first length and a fourth length proximally 80% longer than said first length;
   b. said third length applicable with less than one kilogram tensile force pulling said first and second end sections apart;
   c. said fourth length applicable with less than two kilogram tensile force pulling said first and second end sections apart.

6. The restraining device of claim 4 further including a sleeve about said first handle means.

7. The restraining device of claim 4 wherein a hollow braid consists of more than 8 braided cords.

8. A restraining device comprising of:
   a. a unitary stretch member having a length of braid and an internal elastic member affixed substantially between a first and a second end section such that said braid forms curls in a retracted state;
   b. a first handle means located at said first end section;
   c. a clasping device located substantially about said second end section.

9. The restraining device of claim 8 further including a second handle means located within close proximity to said second end section.

10. The restraining device of claim 8 further including a sleeve about said first handle means.

11. The restraining device of claim 8 having:
    a. a third length at least 40% longer than said first length and a fourth length proximally 80% longer than said first length;
    b. said third length applicable with less than one kilogram tensile force pulling said first and second end sections apart;
    c. said fourth length applicable with less than two kilogram tensile force pulling said first and second end sections apart.

12. A restraining device comprising of:
    a. a unitary stretch member having a hollow braid member and an elastic member affixed therein substantially between a first end section and a second opposite end section so as to retract said hollow compliant member;
    b. said unitary stretch member having a length that is variable, including a first length in a retracted state, a second length in a fully extended state, a third length at least 40% longer than said first length and a fourth length proximally 80% longer than said first length;
    c. said third length is applicable with less than one kilogram tensile force pulling said first and second end sections apart and said fourth length applicable with less than two kilograms tensile force pulling said first and second end sections apart;
    d. said hollow compliant member sufficiently stiff in tension so as to primarily define said second length;
    e. a first handle means located at said first end section, a second handle means located within close proximity to said second end section and a clasping device located substantially about said second end section.

13. The restraining device of claim 12 further including a sleeve about said first handle means.

14. The restraining device of claim 12 wherein said hollow braid consists of more than 8 braided cords.

* * * * *